United States Patent
Mitchell

(10) Patent No.: US 9,221,553 B1
(45) Date of Patent: Dec. 29, 2015

(54) PEER-TO-PEER MOBILE SATCOM

(71) Applicant: James P. Mitchell, Cedar Rapids, IA (US)

(72) Inventor: James P. Mitchell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 84 days.

(21) Appl. No.: 13/928,061

(22) Filed: Jun. 26, 2013

(51) Int. Cl.
*G01C 23/00* (2006.01)
*B64D 45/00* (2006.01)

(52) U.S. Cl.
CPC ..................... *B64D 45/00* (2013.01)

(58) Field of Classification Search
CPC ..... B64D 15/20; B64D 31/14; B64D 11/0015
USPC ........................................... 701/3
See application file for complete search history.

(56) References Cited

U.S. PATENT DOCUMENTS

| | | | |
|---|---|---|---|
| 5,593,114 A * | 1/1997 | Ruhl | 244/183 |
| 5,978,715 A * | 11/1999 | Briffe et al. | 701/11 |
| 6,112,141 A * | 8/2000 | Briffe et al. | 701/14 |
| 6,199,008 B1 * | 3/2001 | Aratow et al. | 701/120 |
| 6,975,600 B1 * | 12/2005 | Vaughan et al. | 370/321 |
| 8,712,321 B1 * | 4/2014 | Dankberg | 455/12.1 |
| 2001/0003809 A1 * | 6/2001 | Hayashi et al. | 701/120 |
| 2004/0183695 A1 * | 9/2004 | Ruokangas et al. | 340/945 |
| 2005/0024236 A1 * | 2/2005 | Gosdin et al. | 340/905 |
| 2007/0198143 A1 * | 8/2007 | Ybarra et al. | 701/9 |
| 2008/0025561 A1 * | 1/2008 | Rhoads et al. | 382/100 |
| 2009/0088972 A1 * | 4/2009 | Bushnell | 701/210 |
| 2010/0035607 A1 * | 2/2010 | Horr et al. | 455/428 |
| 2010/0168939 A1 * | 7/2010 | Doeppner et al. | 701/16 |
| 2013/0315125 A1 * | 11/2013 | Ravishankar et al. | 370/312 |

\* cited by examiner

*Primary Examiner* — Behrang Badii
*Assistant Examiner* — Daniel L Greene
(74) *Attorney, Agent, or Firm* — Angel N. Gerdzhikov; Donna P. Suchy; Daniel M. Barbieri

(57) ABSTRACT

An on-board aircraft computer is configured to receive flight relevant data from another aircraft through a satellite data link configured to route data between aircraft. The on-board aircraft computer then incorporates such flight relevant data into one or more on-board systems such as a flight management system. The on-board aircraft computer may include two receivers such that a second receiver establishes communication with a second satellite signal during transition between two discrete regions of satellite communication. Furthermore, a satellite routes flight relevant data from one aircraft to another without communication with a ground station.

19 Claims, 10 Drawing Sheets

PEER-TO-PEER MOBILE SATCOM

FIELD OF THE INVENTION

The present invention is directed generally toward satellite communication, and more particularly toward data communication between aircraft through a satellite data link.

BACKGROUND OF THE INVENTION

Data communication between aircraft beyond line-of-sight requires contact with one or more ground stations. Communication through one or more ground stations causes latency and adds cost. Data communication between aircraft would be advantageous for sharing flight relevant data such as lighting, icing, turbulence, wind and other weather, radar, NEXRAD and any other data that could be time critical to a flight. On-board aircraft computers could incorporate such data to produce a flight plan or otherwise optimize features of an aircraft route or other properties.

Existing satellites are configured to relay data between ground stations. Such satellites have limited ability to route data traffic and no practical ability to route data traffic between moving aircraft. Consequently, it would be advantageous if an apparatus existed that is suitable for facilitating data communication between aircraft beyond line-of-sight through a satellite data link.

SUMMARY OF THE INVENTION

Accordingly, the present invention is directed to a novel method and apparatus for facilitating data communication between aircraft beyond line-of-sight through a satellite data link.

In at least one embodiment of the present invention, an on-board aircraft computer is configured to receive flight relevant data from another aircraft through a high bandwidth signal. In one embodiment, the high bandwidth signal is routed through a satellite data link configured to route data between aircraft. The on-board aircraft computer then incorporates such flight relevant data into one or more on-board systems such as a flight management system. In another embodiment, the on-board aircraft computer includes two receivers such that a second receiver establishes communication with a second satellite signal during transition between two discrete regions of satellite communication.

In another embodiment of the present invention, a satellite receives flight relevant data from an aircraft and routes such data through an on-board satellite switch to a second aircraft. Where the satellite is configured to maintain discrete regions of communication (spot beams), the satellite routes data from one spot beam to another, and updates relevant internet protocol (IP) address settings to maintain a data link between two aircraft. In another embodiment, a satellite broadcasts flight relevant data from one aircraft to a plurality of aircraft defined by a set of addresses such as IP addresses corresponding to one or more aircraft.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

As data transmission in aircraft increases, VHF data channels and automatic dependent surveillance-broadcast (ADS-B) communications systems are projected to become overtaxed. ADS-B is a surveillance technology for tracking aircraft. By 2020 The United States will require the majority of aircraft operating within its airspace to be equipped with some form of ADS-B. Likewise, at least some aircraft operating in Europe will be required to carry ADS-B beginning in 2015. Ground based ADS-B May be limited by node capacity and latency.

Where aircraft are configured to share flight relevant data, an airborne aircraft may transmit flight relevant data in a high bandwidth frequency directly to other aircraft in the fleet. The receiving aircraft incorporates the flight relevant data into one or more on-board computer systems configured for flight management.

Satellite communication offers an additional channel for data communication between aircraft. "One hop" communication between aircraft through a satellite may be faster are more efficient as compared to ground based communication; however, small aircraft are disadvantaged because antennas capable of both receiving and transmitting in frequency bands proposed for future satellite communication are larger than is practical for small aircraft; even small commercial aircraft.

Figure 1:
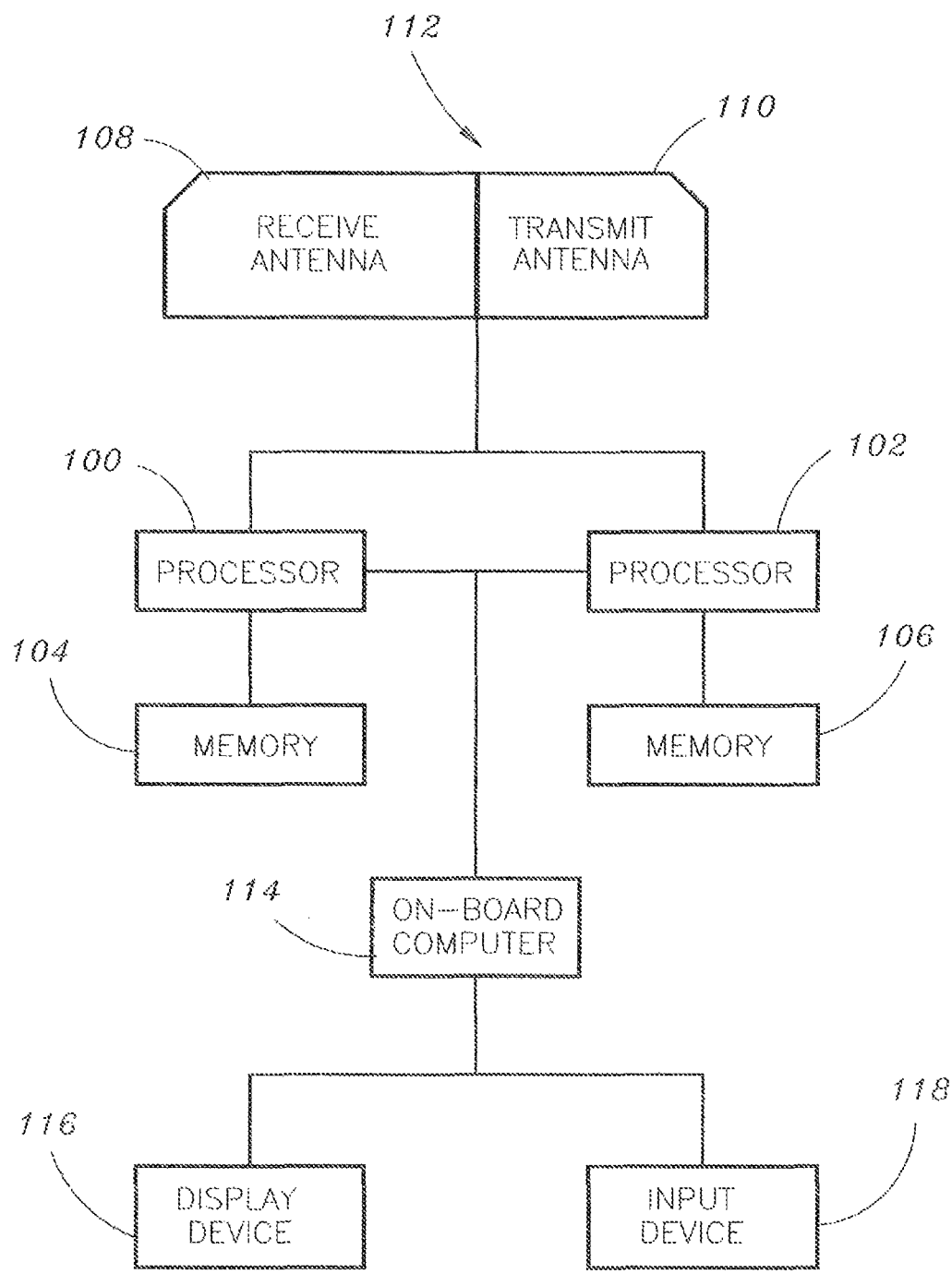
FIG. 1 shows a computer apparatus suitable for implementing embodiments of the present invention.

Referring to FIG. 1, a computer apparatus suitable for implementing embodiments of the present invention is shown. In at least one embodiment, a receiver in an aircraft includes a processor 100 and memory 104 connected to the processor. The processor 100 may receive data through an antenna 112 connected to the processor 100 and send such data to an on-board computer 114 configured to parse and incorporate such data into one or more systems relevant to the flight. In at least one embodiment, the antenna 112 is configured to receive signals from an airborne aircraft without contact with a ground station. In at least one embodiment, the signal is relayed through a satellite capable of high bandwidth signal switching and routing. The transmitting aircraft sends flight relevant data such as radar images, wind data and other in-flight telemetry.

Satellites may provide broadband facilities for data transfer from the transmitting aircraft to the receiving aircraft because the satellites operate in a frequency band capable of accommodating such data transfer. In that case, the transmitting aircraft may send full-motion, real-time radar imagery and other bandwidth intensive data packets. Frequency bands capable of accommodating such broadband traffic include the Ka band, Ku band, C band, L band, X band or other such frequency bands. In at least one embodiment, a transmitting aircraft may be a large commercial aircraft capable of housing an antenna 112 with the ability to transmit in high frequency bands similar to broadband capable satellites.

In at least one embodiment, the antenna 112 may include a receiving element 108 configured to receive in one or more bands such as the Ka band, the Ku band, the C band, L band, X band or other bands associated with high bandwidth transmissions. An aircraft may be too small to accommodate a transmitting element 110 configured to transmit in certain bands; in such case the antenna 112 may include a transmitting element 110 configured to transmit in a frequency band different from at least one of the receiving bands. In at least one embodiment, the antenna 112 may be a receiving element 108 configured to receive a Ka band signal and a smaller transmitting element 110 configured to transmit an L band signal. Such an antenna 112 may be one one-hundredth the area of an antenna configured to both transmit and receive Ka band signals.

In at least one embodiment of the present invention, an aircraft may be configured to send and/or receive satellite signals to and from a satellite operating two or more spot beams to relay data traffic through an on-satellite switch. In such a system, the aircraft may include one radio dynamically configured for each new spot beam that the aircraft traverses through using pre-arranged subscribed authorization codes for each beam or optionally two radios/receivers, a first receiver including a first processor 100 connected to a first memory 104, and a second receiver including a second processor 102 connected to a second memory 106. Each of the first and second processors 100, 102 are configured to send and/or receive signals through a satellite enabled antenna 112. The first receiver may be associated with a unique electronic serial number (ESN) and a network identifier such as an IP address that is operable within a region defined by a first spot beam. As an aircraft approaches a transition to a neighboring, second spot beam, the second receiver (also referred to as a hot spare) may be associated with another unique network identifier operable within a region defined by the second spot beam. Once the aircraft fully transitions into the region defined by the second spot beam, the first receiver may become the hot spare.

Once flight relevant data is received, the on-board computer 114 may display such data on one or more connected display devices 116. The display devices 116 may include multifunction displays, 3-D display, heads-up displays, LCD, LED displays, emissive displays or any other display technology suitable for inclusion in a flight deck. The display and general usefulness of the data may require one or more input devices 118 connected to the on-board computer 114. The input devices 118 may include a touch sensitive device, keyboard, keypad, mouse, trackball or any other mechanism to receive user input.

The one or more input devices 118 and one or more display devices 116 may be embodied in a single apparatus such as a touch sensitive display screen. The specific embodiments of input devices 118 and display devices 116 should not be considered limiting.

In one embodiment, the on-board computer 114 may display or provide the option to display data separated by source such that data received from another aircraft may be displayed separately from data received from an on-board radar or from a source such as the National Weather Service. For example, weather data received from a leading aircraft may be displayed separately from regional weather data provided by a service. Alternatively, the on-board computer 114 may combine similar or related data from multiple sources to produce a combined dataset and display such combined dataset on the display devices 116. Data used to create the combined dataset may be prioritized based on factors such as recency, proximity or relevance. For example, a combined display may include regional weather data provided by a service except where such regional data is superseded by local data provided by an aircraft currently generating such data.

The on-board computer 114 may receive and display or combine data from multiple sources such as other aircraft, services such as the National Weather Service, ADS-B, or communications systems such as HF, VHF, UHF, SATCOM or peer-to-peer systems.

Figure 2:
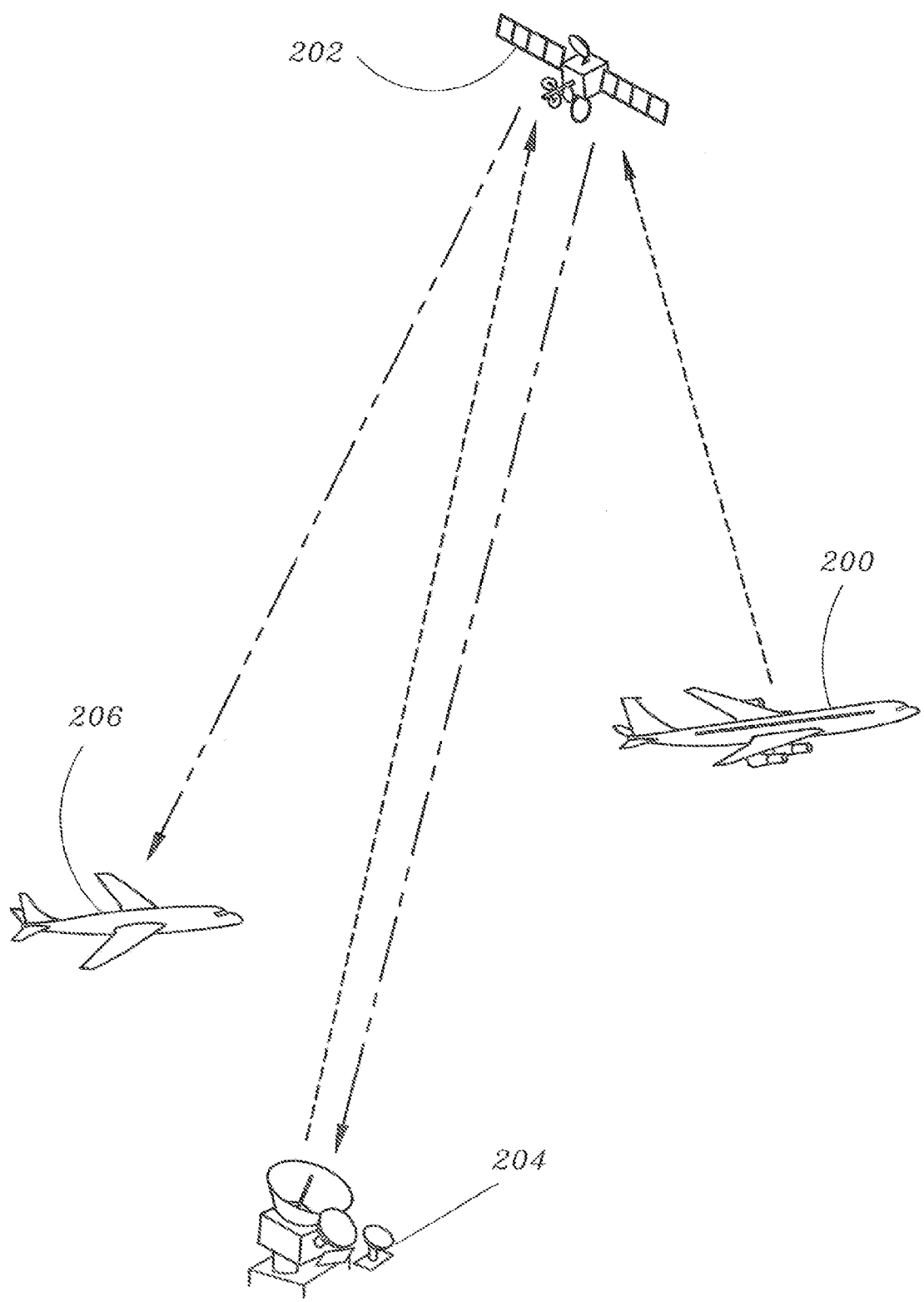
FIG. 2 shows an environmental representation of one embodiment of the present invention.

Referring to FIG. 2, an environmental representation of one embodiment of the present invention is shown. In one embodiment of the present invention, a first aircraft 200 configured to transmit data in a frequency band operable for satellite communication transmits flight relevant data to a satellite 202. The flight relevant data is directed toward a second aircraft 206 configured to receive data in a frequency band operable for satellite communications. In one embodiment, a ground station 204 such as a network operation center may operate as an intermediate destination to route the data from the first aircraft 200 to the second aircraft 206. In that embodiment, all data directed from one aircraft to another travels from the first aircraft 200 to the satellite 202, then to the ground station 204 for routing and back to a satellite 202 (either the same or a different satellite 202) and finally to the second aircraft 206.

Where the satellite 202 operates in a frequency capable of supporting broadband data traffic, the first aircraft 200 may transmit bandwidth intensive flight relevant data such as full-motion radar imagery. Where a ground station 204 is necessary for routing, every data packet effectively consumes twice as much satellite bandwidth as a similar data transfer without involving the ground station 204.

Figure 3:
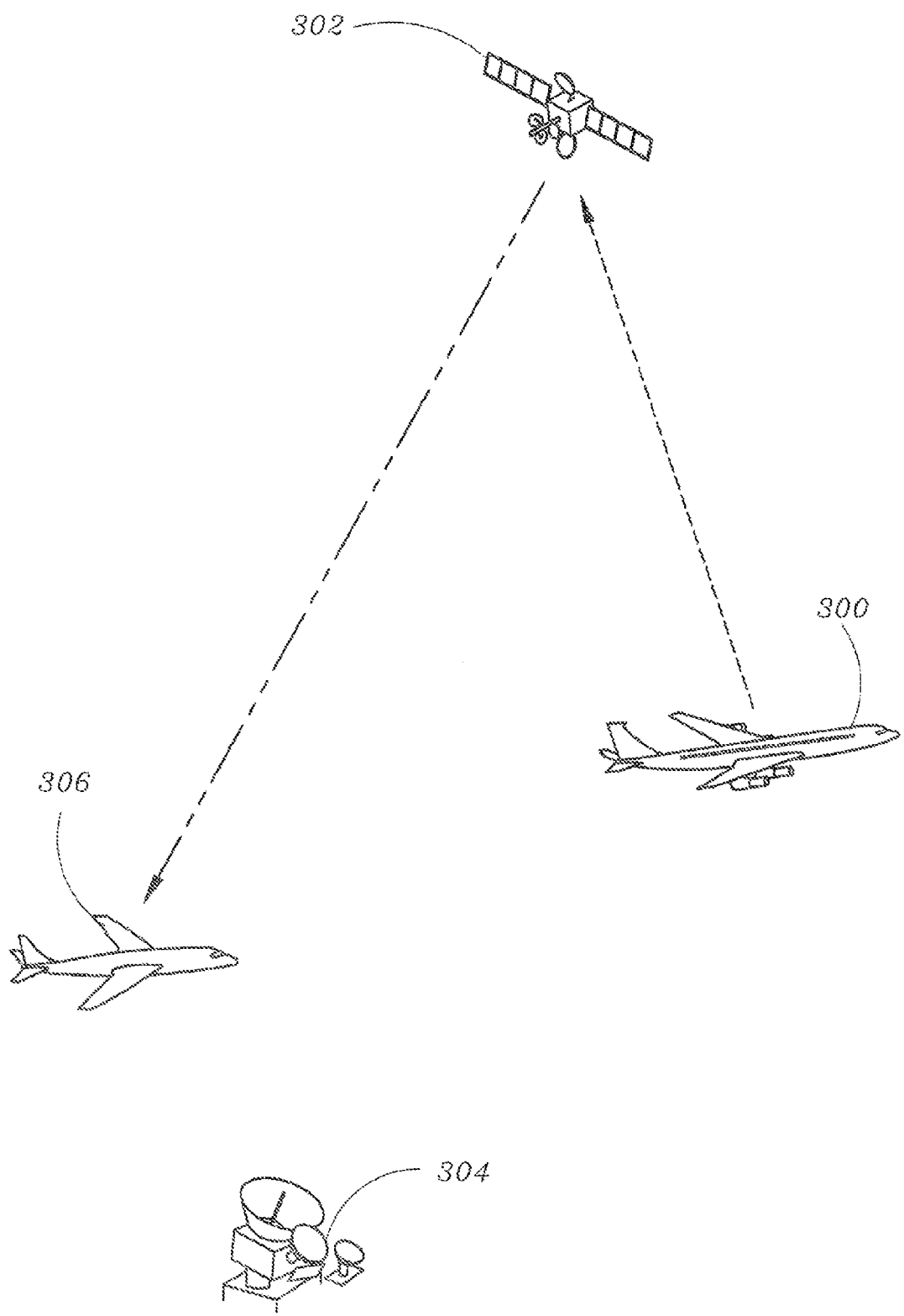
FIG. 3 shows an environmental representation of one embodiment of the present invention.

Referring to FIG. 3, an environmental representation of one embodiment of the present invention is shown. In one embodiment of the present invention, a first aircraft 300 configured to transmit data in a frequency band operable for satellite communication transmits flight relevant data to a satellite 302. The flight relevant data is directed toward a second aircraft 306 configured to receive data in a frequency band operable for satellite communications. The satellite 302 includes on-board switching capability to route data based on one or more network addresses indicating the intended recipients of the data. Depending on the coverage area and configuration of the satellite 302, all aircraft 300, 306 within range of the satellite 302 may be associated with a unique IP address or other network identifier.

The satellite 302 may segregate its area of coverage into spot beams. In that case, the satellite 302 may maintain a current list of network addresses associated with each spot beam such that a data packet directed to a particular network address may be first directed to the appropriate spot beam for transmission.

The second aircraft 306 may be of such a size and capability that it cannot transmit to the satellite 302. In that case, the second aircraft 306 may at its option acknowledge messages from the first aircraft 300 by more traditional means such as transmission through a lower bandwidth antenna or a signal relayed through one or more ground stations 304. Otherwise the second aircraft may accept the message as a receive-only without acknowledgement.

Figure 4:
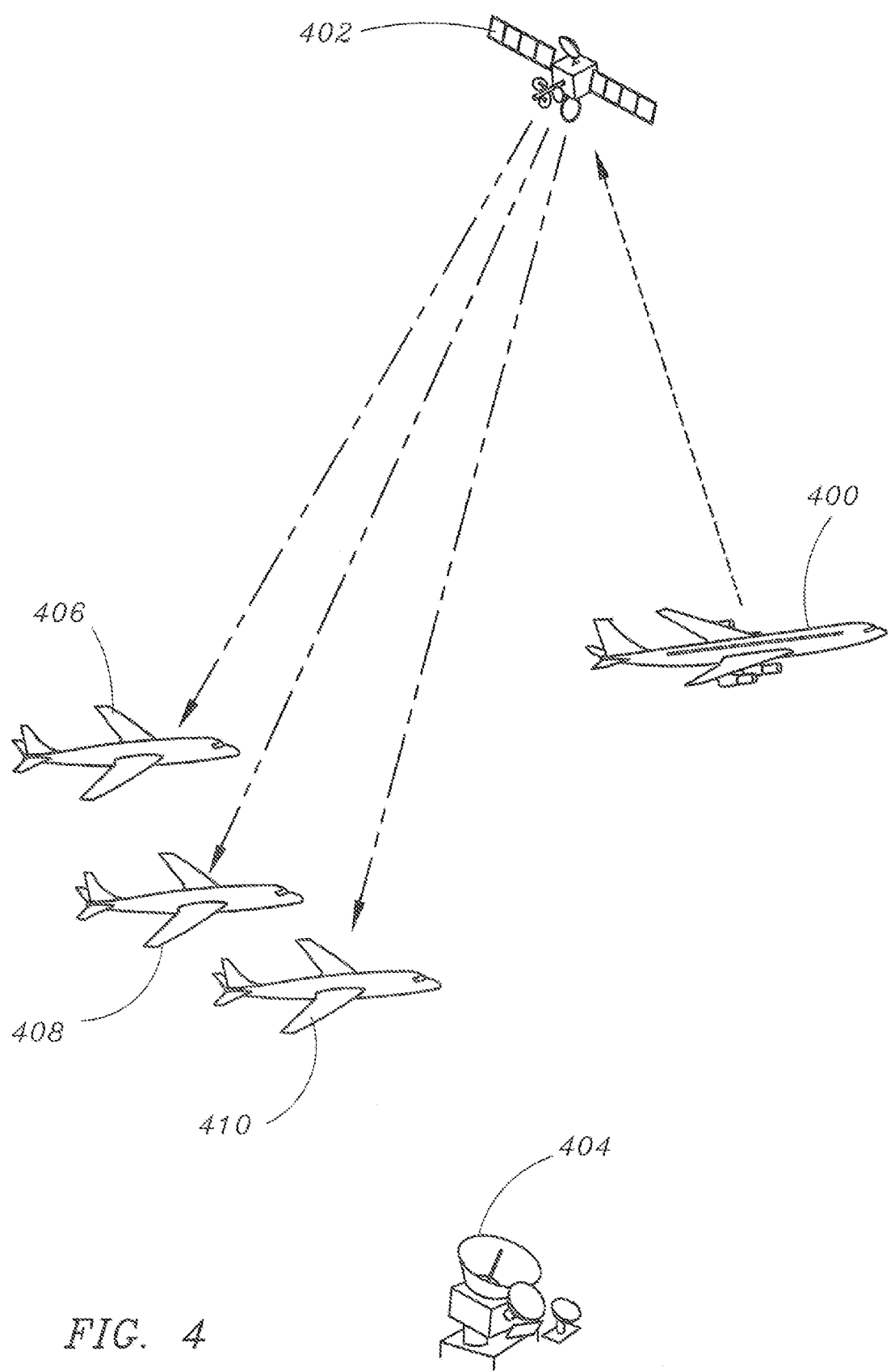
FIG. 4 shows an environmental representation of one embodiment of the present invention.

Referring to FIG. 4, an environmental representation of one embodiment of the present invention is shown. In one embodiment of the present invention, a first aircraft 400 configured to transmit data in a frequency band operable for satellite communication transmits flight relevant data to be relayed through a satellite 402. The flight relevant data is directed toward a fleet of receiving aircraft 406, 408, 410 configured to receive data in a frequency band operable for satellite communications. The satellite 402 includes on-board switching capability to route data based on one or more individual or group network addresses indicating the intended recipients of the data. Depending on the coverage area and configuration of the satellite 402, all aircraft 400, 406, 408, 410 within range of the satellite 402 may be associated with a unique IP address or other network identifier. In at least one embodiment, the satellite 402 is configured to broadcasts or multicasts data packets to more than one receiving aircraft 406, 408, 410.

The satellite 402 may segregate its area of coverage into spot beams. In that case, the satellite 402 may maintain a current list of network addresses associated with each spot beam such that a data packet directed to a particular network address may be first directed to the appropriate spot beam for transmission.

Each receiving aircraft 406, 408, 410 may be of such a size and capability that it cannot transmit to the satellite 402. In that case, the second aircraft 406 may optionally acknowledge messages from the first aircraft 400 by more traditional means such as transmission through a lower bandwidth antenna or a signal relayed through one or more ground stations 404. Alternatively one or more aircraft may choose not to acknowledge message.

Figure 5:
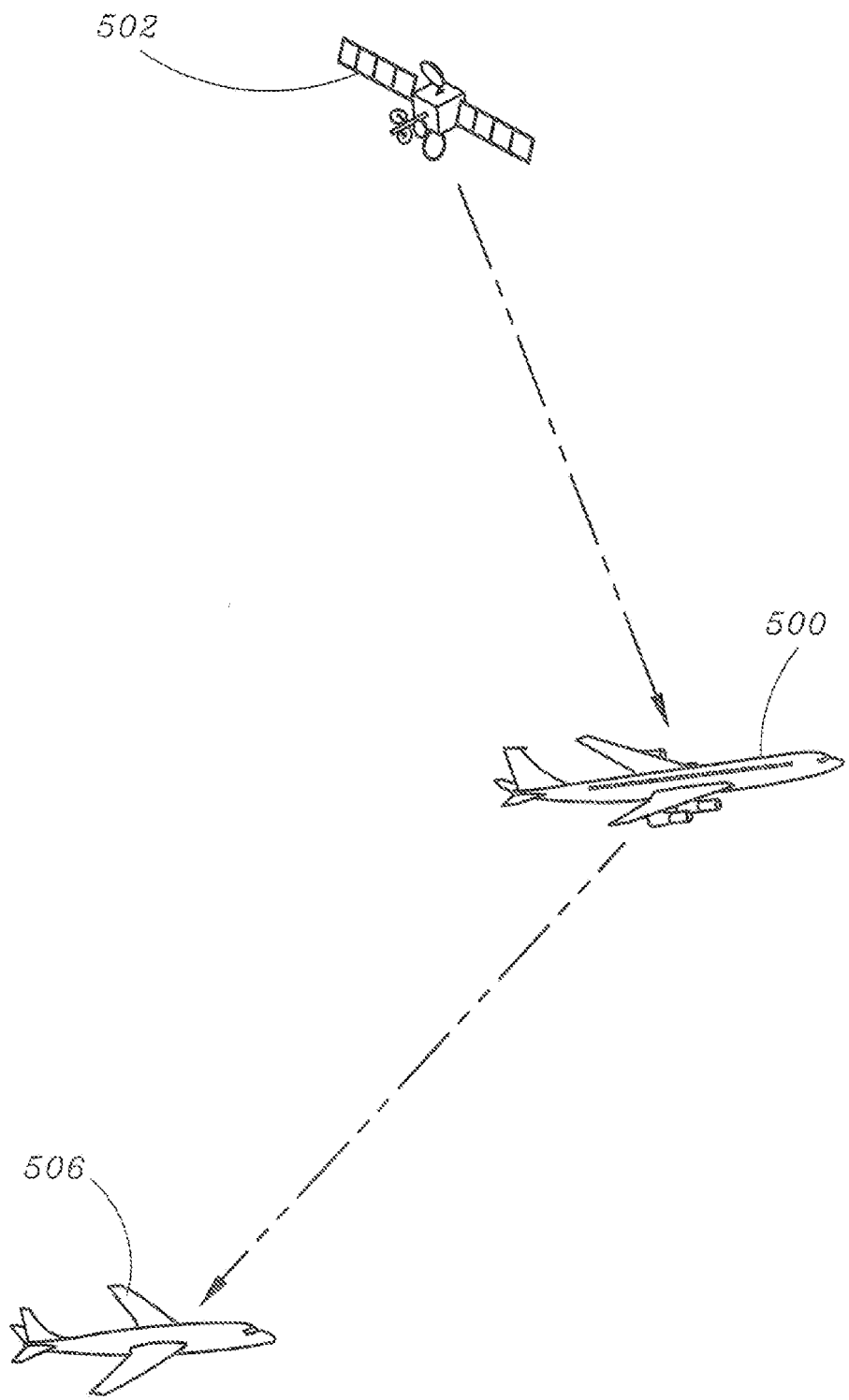
FIG. 5 shows an environmental representation of one embodiment of the present invention.

Referring to FIG. 5, an environmental representation of one embodiment of the present invention is shown. In one embodiment of the present invention, a first aircraft 500 configured to receive data in a frequency band operable for satellite communication receives flight relevant data from a satellite 502. The flight relevant data is directed toward one or more aircraft 500, 506 configured to receive flight relevant data and incorporate such flight relevant data into one or more on-board computer systems.

Where a second aircraft 506 is not configured to receive data in a frequency band operable for satellite communication, the first aircraft 500 may retransmit such received data in a frequency band useful to the second aircraft 506.

Figure 6:
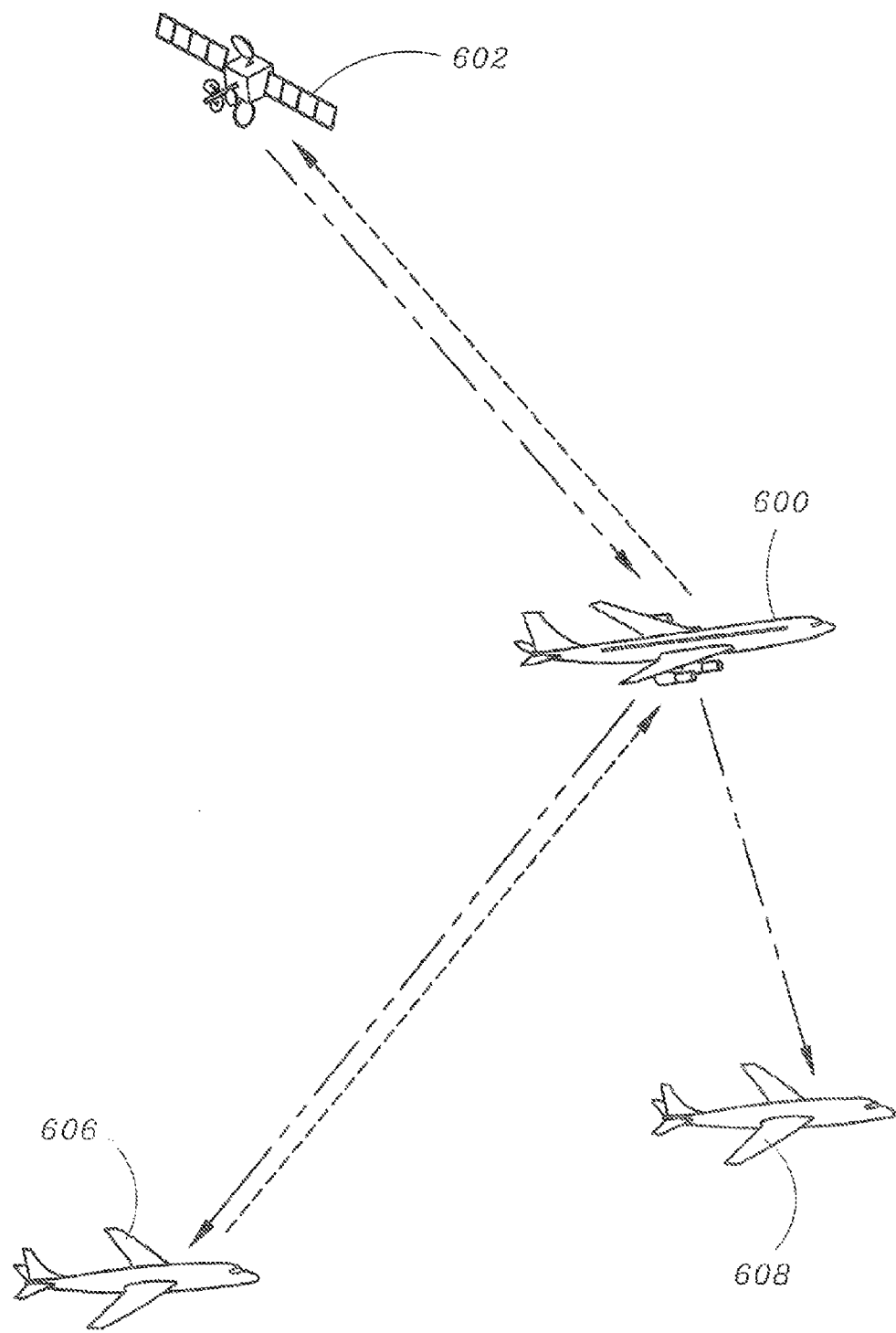
FIG. 6 shows an environmental representation of one embodiment of the present invention.

Referring to FIG. 6, an environmental representation of one embodiment of the present invention is shown. In one embodiment of the present invention, a first aircraft 600 equipped for high bandwidth data communication serves as a data routing hub for one or more signals between one or more satellites 602 and one or more additional aircraft 606, 608. The additional aircraft 606, 608 may be equipped for high or low bandwidth transmissions; and the first aircraft 600 may relay high bandwidth signals in a low bandwidth frequency band to small aircraft 608 unequipped to receive high bandwidth signals.

Figure 7:
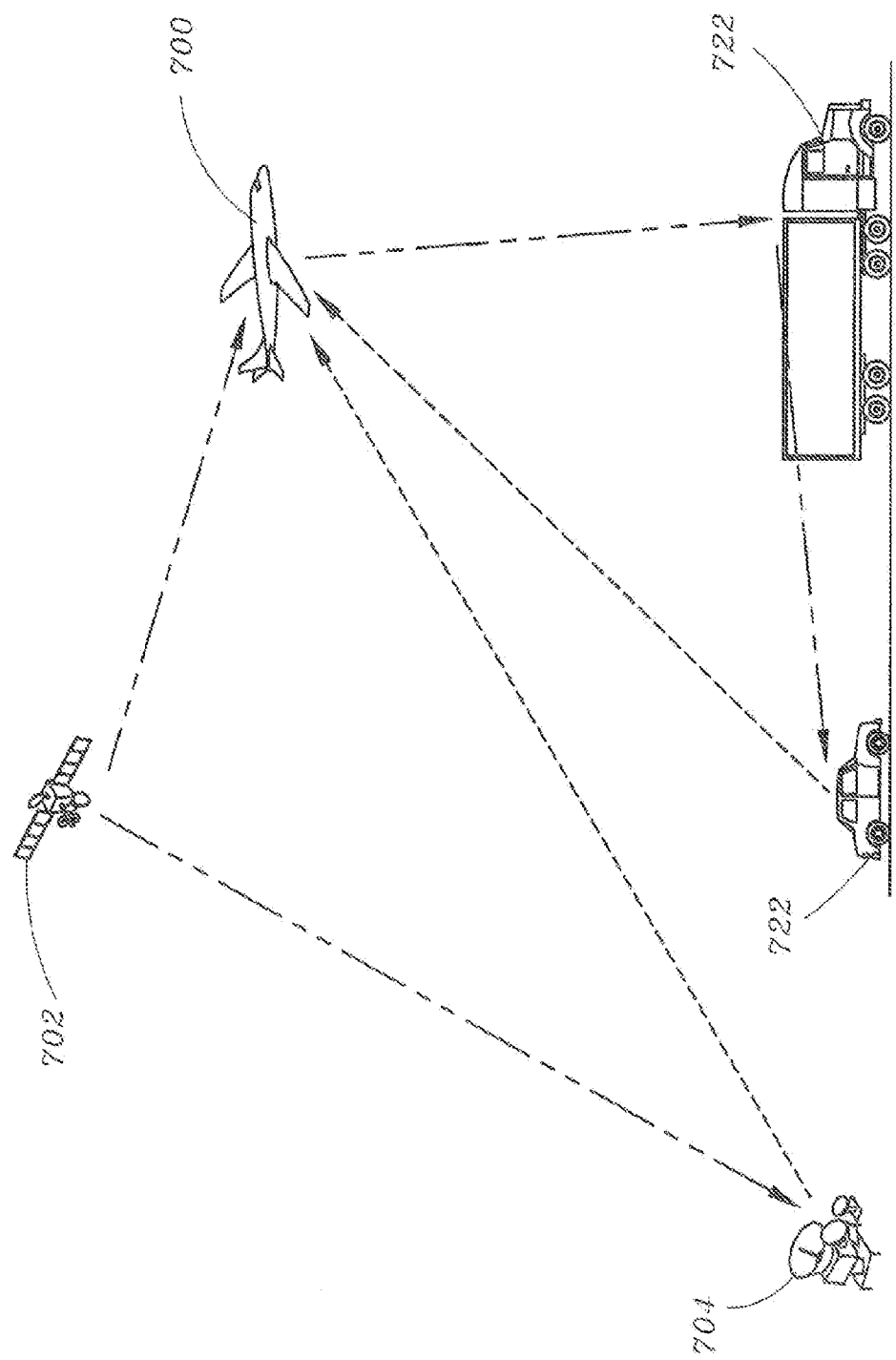
FIG. 7 shows an environmental representation of one embodiment of the present invention.

Referring to FIG. 7, an environmental representation of one embodiment of the present invention is shown. In one embodiment of the present invention, an aircraft 700 receives one or more signals in a high bandwidth frequency band from one or more satellites 702. The aircraft 700 may relay such high bandwidth signals to one or more ground vehicles 722. Furthermore, the aircraft 700 may receive signals from a ground station 704 and relay such signals to ground vehicles 722. Also, an aircraft 700 equipped to transmit in a high bandwidth frequency may relay signals in such high bandwidth frequency from low bandwidth sources.

Figure 8:
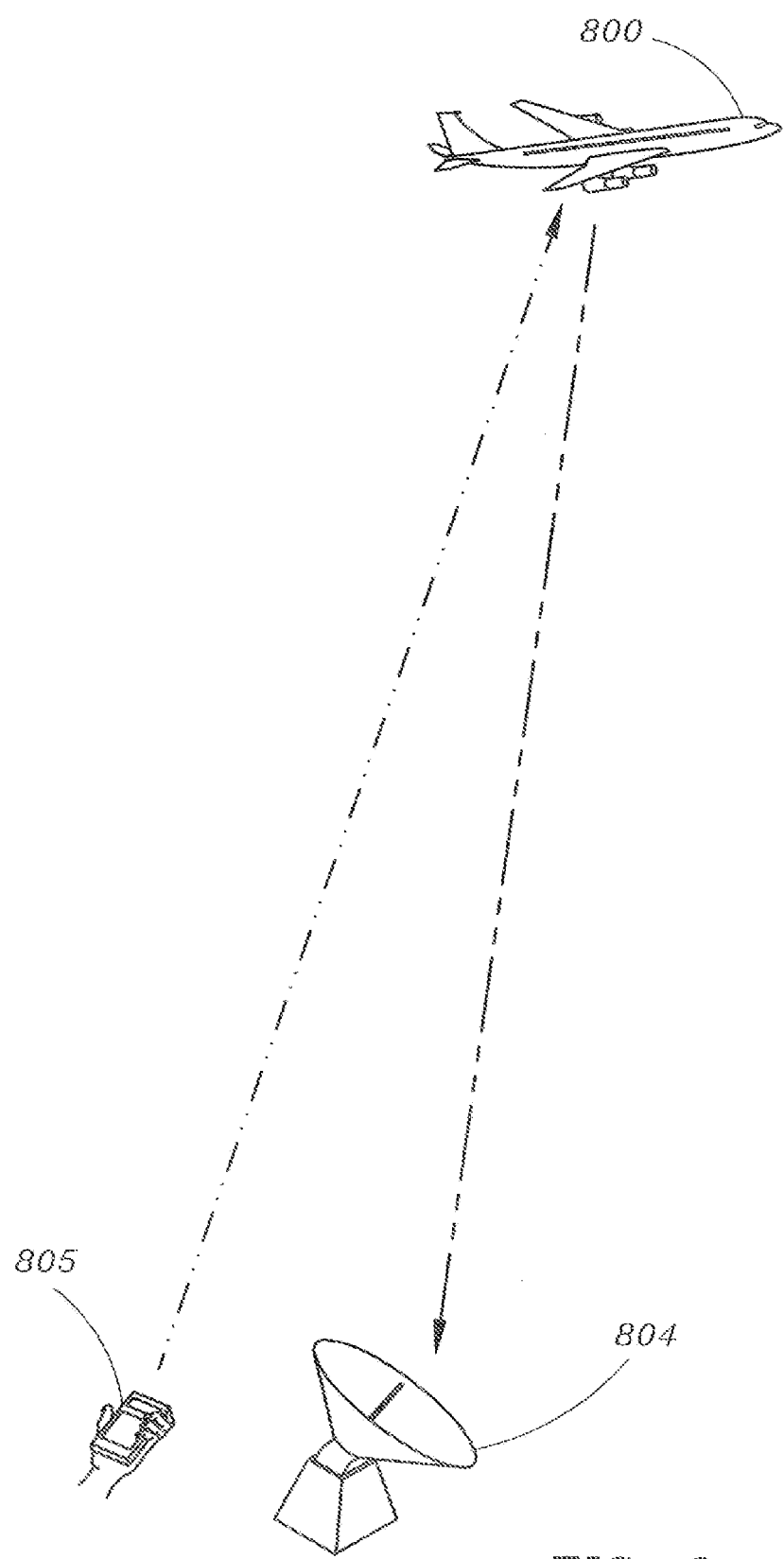
FIG. 8 shows an environmental representation of one embodiment of the present invention.

Referring to FIG. 8, an environmental representation of one embodiment of the present invention is shown. In one embodiment of the present invention, an aircraft 800 configured to transmit signals in a frequency band compatible with high bandwidth satellites relays signals from a user device 805 to a ground station 804 configured to communicate with one or more satellites.

Figure 9:
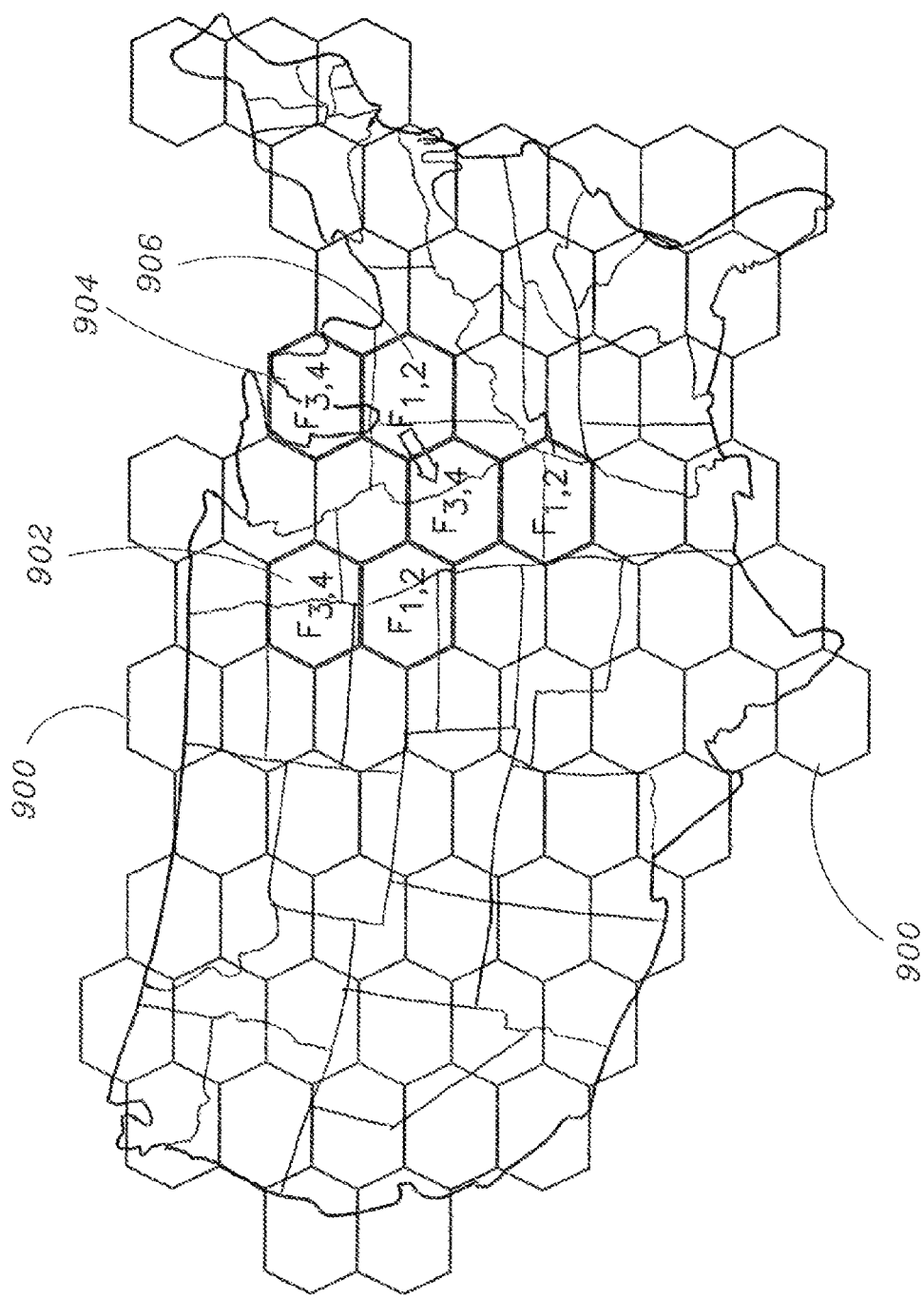
FIG. 9 shows an environmental representation of zones according to one embodiment of the present invention.

Referring to FIG. 9, an environmental representation of zones according to one embodiment of the present invention is shown. Some current and near future embodiments of satellite communication utilize peer-to-peer IP switching for fixed terrestrial communication; for example commercial and residential internet service. Because the satellites route data to known, fixed locations, routing can utilize spot beams 900 to differentiate network addresses.

Where satellites include spot beams 900 (on different adjacent bands) with peer-to-peer data capability for vectoring IP switched data, a first aircraft with the capability to transmit in a band useful to such satellites may send flight relevant data in such band to a satellite. Flight relevant data may include radar, weather, wind, air information services or other data. Data packets sent by the first aircraft may include IP specific routing data corresponding to other aircraft authorized to receive such data, or for which such flight relevant data may be applicable. For example, the first aircraft may transmit data packets including real-time, geolocation registered streaming radar images to a satellite. The data packets may include a list of IP addresses corresponding to other aircraft in the same fleet; furthermore, the data packets may include data indicating a location or flight path corresponding to the radar images to facilitate the incorporation of such data by an on-board computer of the receiving aircraft. Data packets may be transmitted in the Ka band, Ku band, C band, L band, X band or any other data channel useful to satellite configured to route such data through on-board switching capability.

The first aircraft may be operating within the coverage area of a first spot beam 902 at the time of transmission while a second, receiving aircraft may be operating in a second, different spot beam 904. The satellite may identify the location of the second, receiving aircraft based on the IP addresses embedded in the data packets from the first aircraft. In one embodiment, aircraft capable of transmitting in an appropriate band may update their location with appropriate satellites such that a satellite attempting to transmit to such aircraft may resolve the aircraft's IP address to a corresponding spot beam 902. Satellites generally maintain a fixed set of IP addresses correlated a spot beam 900, 902, 904, 906. Such correlated IP addresses are not changed often by satellite network operations. Aircraft may use a table of fixed IP addresses and select from those fixed IP addresses as the aircraft moves in and out of spot beams 900, 902, 904, 906. Alternatively, each aircraft may be assigned a fixed IP address associated with the unique spot beam 900, 902, 904, 906 servicing the aircraft by some network controller. All aircraft may be made aware of current IP addresses for other aircraft, either through satellite transmitted updates or periodic ground based updates. In another embodiment, aircraft that are not capable of transmitting to a satellite (for example, aircraft that cannot support the proper transmitting antenna) may communicate the aircraft's location to a ground station (such as a network operations center). As a system option, ground stations may continuously or periodically update one or more satellites' on-board switches with new identification parameters for aircraft including receiver identification codes, security, and position location updates correlating to IP address changes, such that the one or more satellites may determine a spot beam 900, 902, 904, 906 operable to route data packets to such aircraft without the need to route such data packets through a ground station. Direct satellite routing of data traffic from one aircraft to another effectively doubles the satellites capacity for such traffic.

As aircraft move, they may move from a region serviced by one spot beam 900, 902, 904, 906 to a region serviced by a neighboring spot beam 900, 902, 904, 906. An aircraft may include more than one radio. Two receivers may be configured to receive data from satellites transmitting in a spot beam 900, 902, 904, 906 configuration. For example, during transition from one spot beam 900, 902, 904, 906 to another, a first receiver continues to receive data transmitted in a second spot beam 904 while a second receiver begins to receive data transmitted in a third spot beam 906. When a reliable data link is established through the second receiver, the first receiver may stop receiving data. Aircraft may utilize global positioning data, such as from a Global Positioning System (GPS) receiver or other satellite based navigation system, and the known service regions of various spot beams 900, 902, 904, 906 to configure receivers during a transition period.

In another embodiment, an aircraft in one spot beam 900, 902, 904, 906 may transmit flight relevant data only to select IP addresses in select spot beams 900, 902, 904, 906. For example, where an aircraft compiles weather data by traversing a region covered by a spot beam 900, 902, 904, 906, the aircraft may transmit such data to only those aircraft following a similar flight path or located in adjacent spot beams 900, 902, 904, 906. Not all spot beams 900, 902, 904, 906 will necessarily receive such data. Aircraft receiving such data may incorporate the data through an on-board computer to reroute a flight path and avoid adverse weather conditions.

Figure 10:
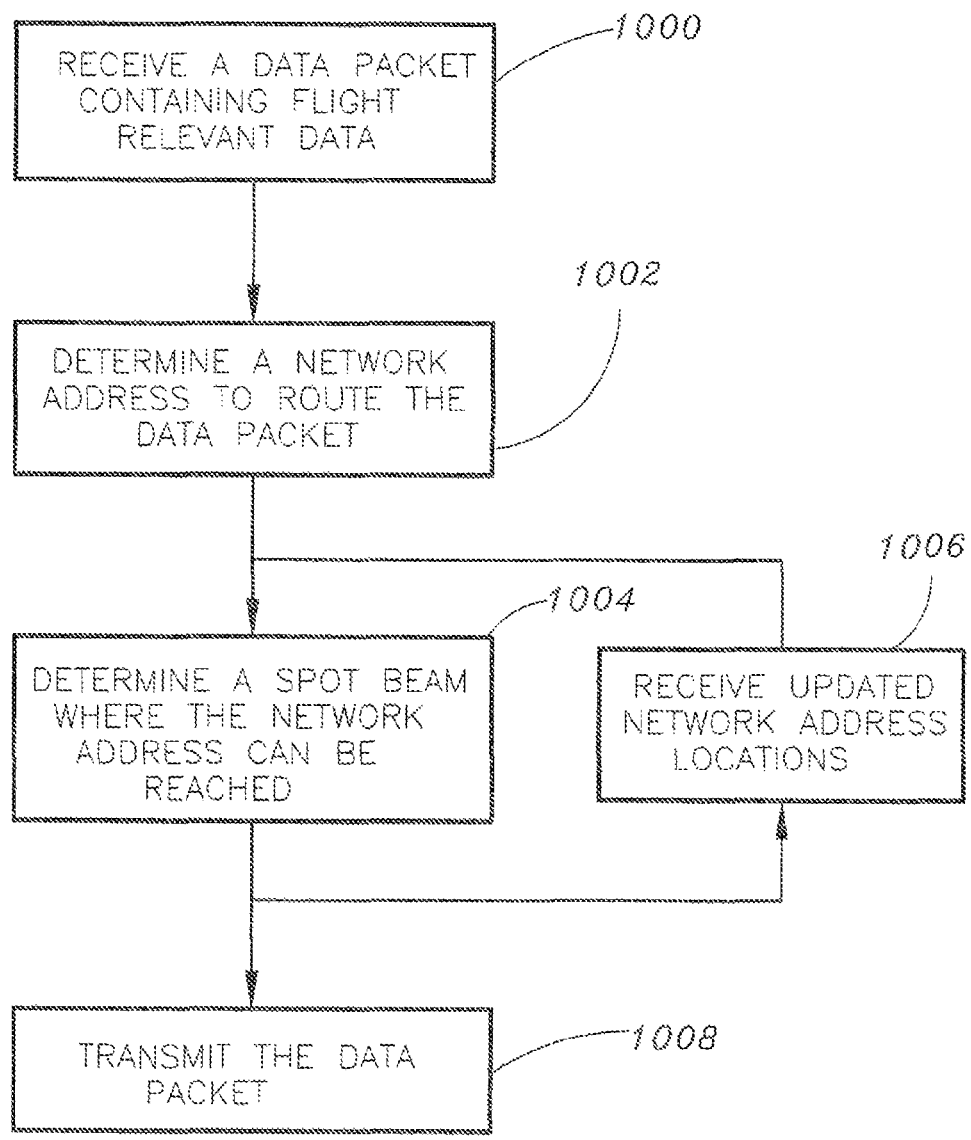
FIG. 10 shows a flowchart of one embodiment of the present invention.

Referring to FIG. 10, a flowchart of one embodiment of the present invention is shown. A satellite configured to receive and route data traffic from one aircraft to another receives 1000 a data packet containing flight relevant data from a first aircraft. The data packet may include one or more network addresses identifying authorized recipient aircraft such as other aircraft within the same fleet of aircraft. The satellite determines 1002 a network address, such as an IP address, to route the data packet. An internal switch within the satellite determines a transmission route for the data packet. In one embodiment, the internal switch may determine 1004 a spot beam from two or more spot beams maintained by the satellite where the network address is currently located. As an option, the satellite may continuously or periodically receive 1006 data from its operations, updates correlating to aircraft location and one or more network addresses to facilitate routing and spot beam selection. When the satellite has determined a general location for transmission, the satellite transmits 1008 the data packet.

It is believed that the present invention and many of its attendant advantages will be understood by the foregoing description of embodiments of the present invention, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A computer apparatus comprising:
   a first in-aircraft receiver comprising:
      a processor;
      memory connected to the processor;
      an antenna connected to the processor; and
      computer executable program code configured to execute on the processor; and
   an in-aircraft transmitter comprising:
      a processor connected to the antenna;
      memory connected to the processor; and
      computer executable program code configured to execute one the processor,
   wherein the processor of the first in-aircraft receiver is configured, via the computer executable program code to:
      receive a data packet from an on-satellite processor switch, through the antenna;
      identify flight relevant data in the data packet; and
      incorporate the flight relevant data into one or more on-aircraft computer systems;
      receive a ground station signal; and
   wherein the processor of the in-aircraft transmitter is configured, via the computer executable program code to:
      receive flight relevant data from one or more on-board computer systems;
      tag the flight relevant data with one or more recipient network addresses, real-time geolocation registered radar images, aircraft flight path data, and aircraft attitude data to facilitate incorporation of such data into one or more on-board systems of another aircraft;
      transmit the flight relevant data to a satellite, through the antenna, for routing to the one or more recipient network addresses; and
      transmit the ground station signal to one or more ground vehicles.

2. The computer apparatus of claim 1, further comprising a global positioning apparatus,
   wherein:
   the processor of the first receiver is further configured to use the global positioning apparatus to determine when the first receiver is approaching a boundary defined by the first spot beam; and
   the processor of the second receiver is further configured to use the global positioning apparatus to determine when the second receiver is approaching a boundary defined by the second spot beam.

3. The computer apparatus of claim 1, wherein the antenna is configured to receive in at least one of a Ka band, a Ku band, a C band, an L band and an X band.

4. The computer apparatus of claim 1, further comprising an on-board computer configured to receive flight relevant data from the receiver, display at least a portion of the flight relevant data on an in-cockpit display unit, and modify a flight path based on such flight relevant data.

5. The computer apparatus of claim 1,
   further comprising:
      a second in-aircraft receiver comprising:
         a processor connected to the antenna;
         memory connected to the processor; and
         computer executable program code configure to execute on the processor, wherein:
the processor of the second in-aircraft receiver is configured, via the computer executable program code to:
receive a data packet from an on-satellite processor switch, through the antenna;
identify flight relevant data in the data packet; and
incorporate the flight relevant data into the one or more on-aircraft computer systems;
the first in-aircraft receiver is associated with a first network address, the first network address addressable by a satellite within a first spot beam; and
the second in-aircraft receiver is associated with a second network address, the second network address addressable by a satellite in a second spot beam.

6. The computer apparatus of claim 5, wherein the antenna is configured to transmit in at least one of a Ka band, a Ku band, a C band, an L band and an X band.

7. The computer apparatus of claim 6, wherein the flight relevant data includes substantially real-time, substantially full-motion weather radar imagery.

8. A satellite comprising:
a processor;
memory connected to the processor;
an antenna connected to the processor; and
computer executable program code configured to execute on the processor,
wherein the processor is configured, via the computer executable program code to:
receive a data packet from a first aircraft;
parse the data packet to identify one or more recipient network addresses corresponding to one or more recipient aircraft and a flight path;
identify one or more additional recipient network addresses corresponding to one or more recipient aircraft following the flight path;
identify one or more ground vehicle network addresses, each corresponding to a ground vehicle;
switch a transmitter;
transmit the data packet to the one or more network addresses and one or more additional recipient network addresses; and
transmit the data packet to the first aircraft for relay to the one or more ground vehicle network addresses.

9. The satellite of claim 8, wherein the antenna is configured to transmit in at least one of a Ka band, a Ku band, a C band, an L band and an X band.

10. The satellite of claim 8, wherein the processor is further configured to:
maintain a data structure associating one or more network addresses with one or more spot beams, each of the one or more spot beams defining a region where an aircraft associated with one of the one or more network addresses is currently located;
identify a spot beam associated with a network address from the data structure; and
switch a transmitter to allow transmission in the identified spot beam.

11. The satellite of claim 10, wherein the processor is further configured to:
receive updated data associating the one or more network addresses with the one or more spot beams; and
update the data structure with the updated data.

12. The satellite of claim 11, wherein receiving updated data comprises receiving data from a ground station.

13. A method for routing data traffic comprising:
receiving a data packet from a first aircraft with an aircraft antenna;
receiving a ground station signal;
parsing the data packet with a processor to identify one or more recipient network addresses corresponding to one or more recipient aircraft and a flight path;
identifying, with a processor, one or more additional recipient network addresses corresponding to one or more recipient aircraft following the flight path;
routing data with an on-satellite switch;
transmitting the data packet to the one or more network addresses and the one or more additional recipient network addresses; and
transmitting the ground station signal to one or more ground vehicles.

14. The method of claim 13, further comprising:
maintaining, with a processor, a data structure associating one or more network addresses with one or more spot beams, each of the one or more spot beams defining a region where an aircraft associated with one of the one or more network addresses may be located;
identifying, with a processor, a spot beam associated with a network address from the data structure; and
switching a transmitter to allow transmission in the identified spot beam.

15. The method of claim 14, further comprising:
receiving updated data associating the one or more network addresses with the one or more spot beams; and
updating, with a processor, the data structure with the updated data.

16. The method of claim 15, wherein receiving updated data comprises receiving data from a ground station.

17. A computer apparatus comprising:
an in-aircraft transmitter comprising:
a processor;
memory connected to the processor;
an antenna connected to the processor; and
computer executable program code configured to execute on the processor,
wherein the processor of the in-aircraft transmitter is configured, via the computer executable program code to:
receive flight relevant data from one or more on-board computer systems;
receive a around station signal;
tag the flight relevant data with one or more recipient network addresses, real-time geolocation registered radar images, aircraft flight path data, aircraft attitude data, and aircraft position data for registration by a recipient aircraft on-board computer, each of the one or more recipient network addresses associated with a recipient aircraft;
transmit the flight relevant data in a high bandwidth frequency band through the antenna; and
transmit the ground station signal to one or more ground vehicles.

18. The computer apparatus of claim 17, wherein transmitting the flight relevant data comprises a direct transmission to an aircraft capable of receiving transmissions in a high bandwidth frequency.

19. The computer apparatus of claim 17, wherein transmitting the flight relevant data comprises transmitting the flight relevant data to a satellite capable of relaying such transmission through an on-board switch.

* * * * *